United States Patent
Uhl et al.

[11] 3,879,174
[45] Apr. 22, 1975

[54] METHOD AND APPARATUS FOR FORMING METALLIZED FILM CAPACITORS

[75] Inventors: John Phillip Uhl, Arlington, Va.; Ki Hong Kim, Poway, Calif.

[73] Assignee: Illinois Tool Works Inc., Chicago, Ill.

[22] Filed: July 17, 1974

[21] Appl. No.: 489,347

Related U.S. Application Data

[63] Continuation-in-part of Ser. No. 440,495, Feb. 7, 1974.

[52] U.S. Cl................................. 29/25.42; 317/260
[51] Int. Cl............................................ H01g 13/00
[58] Field of Search..................... 29/25.42; 317/260; 242/56.1; 156/184, 191, 192

[56] References Cited
UNITED STATES PATENTS

| | | | |
|---|---|---|---|
| 3,153,180 | 10/1964 | Bellmore | 29/25.42 |
| 3,641,640 | 2/1972 | Rayburn | 29/25.42 |
| 3,754,311 | 8/1973 | Rayburn | 29/25.42 |
| 3,758,833 | 9/1973 | Rayburn | 317/260 |

*Primary Examiner*—Carl E. Hall

[57] ABSTRACT

The embodiment of the invention disclosed herein is directed to a method and apparatus for forming metallized film capacitors. A pair of conductive lead wires are positioned in spaced-apart parallel relation to one another and a film having metallized conductive surfaces formed on both sides thereof is positioned between the conductive lead wires. Metallic foil strips are positioned between the respective metallized surfaces and their associated conductive lead wire to provide electrical contact between the metallized surfaces and their respective conductive lead wire. The electrical lead wires are rotated about an axis located between the lead wires to wrap the metallized film and metallic foils thereabout. To insure insulation between the opposite conductive surfaces of the metallized film, a layer of dielectric film is inserted on one side thereof. A removable mandrel is inserted adjacent the conductive lead wires to hold the free end of the dielectric film in position during the initial winding operation. One end of each side of the double-sided metallized film is provided with an unmetallized margin and the ends of the capacitor are sprayed with a conductive film when the capacitor is formed to reduce the resistance of the unit.

11 Claims, 6 Drawing Figures

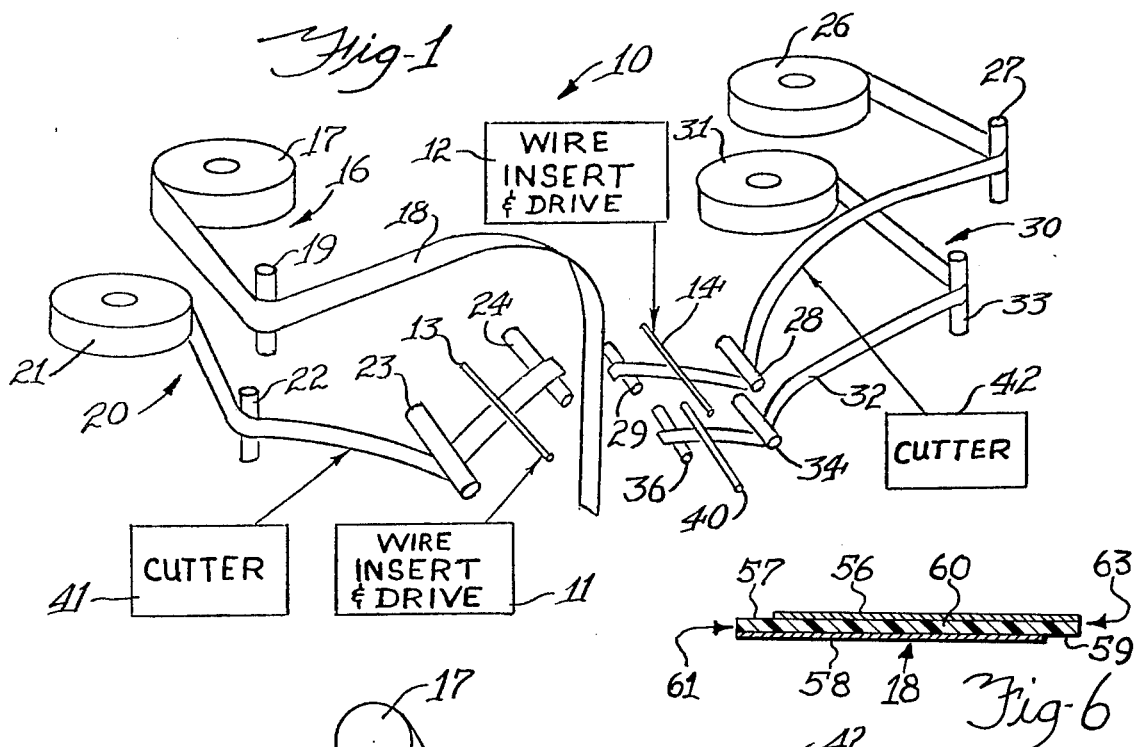
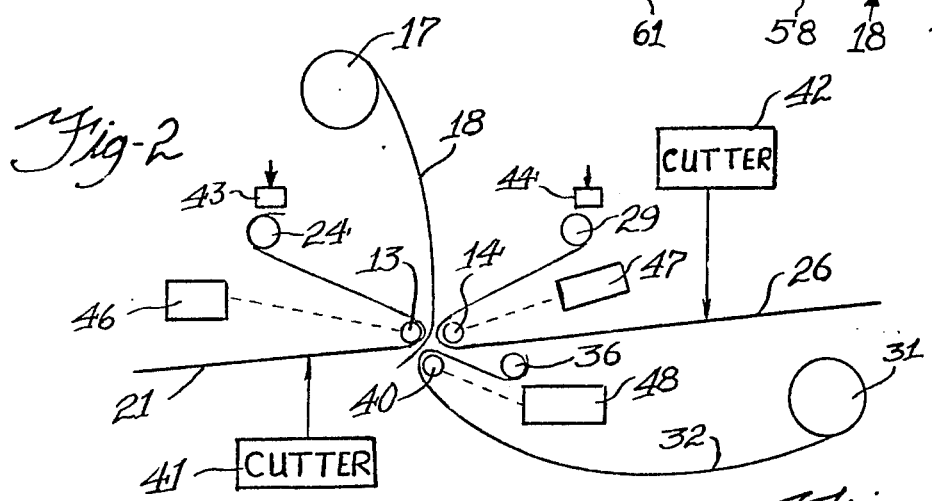
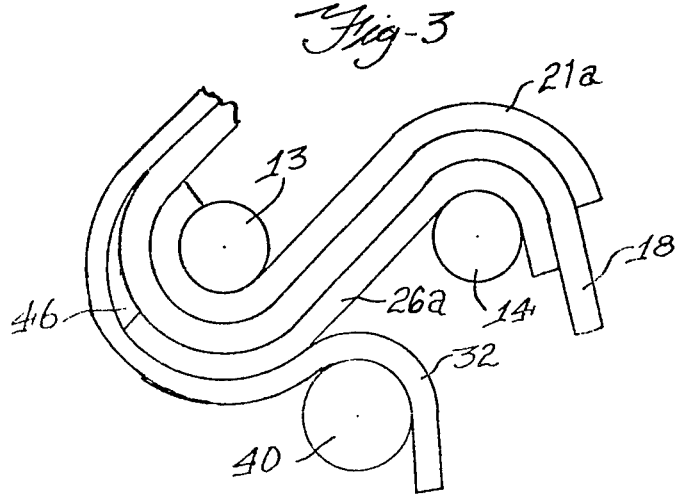
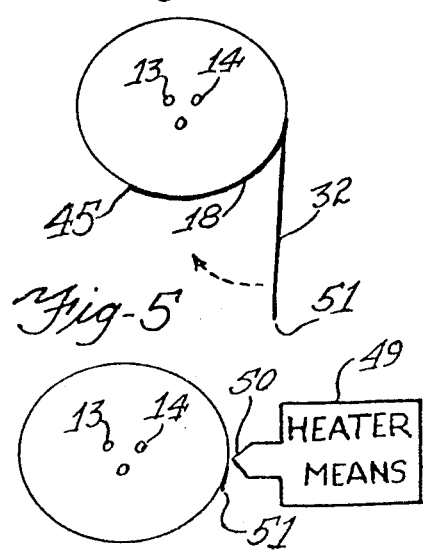

3,879,174

METHOD AND APPARATUS FOR FORMING METALLIZED FILM CAPACITORS

BACKGROUND OF THE INVENTION

This is a continuation-in-part of patent application Serial No. 440,495, filed February 7, 1974.

This invention relates generally to the construction of metallized wound capacitors, and more particularly to a method and apparatus for forming such capacitors.

In the formation of metallized film wound capacitors it has been found advantageous to place a small length of metallic foil, such as tin foil or aluminum foil, in direct contact with the metallized surfaces of the film and the spaced apart conductive lead wires to be connected thereto. The metallic foil provides for improved electrical contact. However, during the formation of such capacitors, the addition of metallized foil requires additional steps and apparatus which substantially complicates the construction of the capacitor and thereby increases the overall cost.

SUMMARY OF THE INVENTION

Accordingly, it is an object of this invention to provide a method and apparatus whereby small lengths of metallized foil can be inserted between the respective conductive lead wires and the opposite conductive metallized surfaces of the film simply and efficiently without substantially increasing the overall cost of construction of such metallized film capacitors.

Briefly, the apparatus of this invention provides means for positioning a pair of conductive lead wires in parallel spaced relation to one another. A dielectric film material has metallized surfaces on both sides thereof and is placed between the conductive lead wires. Metal foil strips are placed in contact between each of the conductive lead wires and their respective metallized film surfaces. These metal foil strips improve the electrical contact made between the conductive lead wires and the metallized surfaces which form the plates of the capacitor. A dielectric film is placed adjacent one side of the metallized film to overlie the associated metal foil and insulate it from contact with the other side of the metallized film surface when the capacitor is wound about the conductive lead wires.

To hold the dielectric film in contact with the rest of the structure, a removable mandrel is inserted into the capacitor. After the capacitor is wound, or any time after initial winding starts, the removable mandrel can be withdrawn from the capacitor and the capacitor wound about the pair of conductive lead wires.

After the desired number of turns of the metallized film and dielectric film are placed about the conductive lead wires, the metallized film and the dielectric film are cut. However, the length of the terminating end of the dielectric film is longer than that of the metallized film so that at least one complete outer wrapping of dielectric material is obtained. This provides a protective layer about the capacitor. The apparatus then provides heating of the dielectric film to form a heat seal along the outer periphery thereby encasing the metallized film and holding the entire wound structure together.

Many other features, objects and advantages of this invention will be more fully realized and understood from the following detailed description when taken in conjunction with the accompanying drawings wherein like reference numerals throughout the various views of the drawings are intended to designate similar elements or components.

BRIEF DESCRIPTION OF THE DRAWINGS

FIG. 1 is a perspective diagrammatic view of an apparatus constructed in accordance with the principles of this invention for forming metallized film capacitors;

FIG. 2 is a diagrammatic representation illustrating the manner in which the metallized film, dielectric film, and metallic foils are placed between and wound about the conductive lead wires and the removable mandrel;

FIG. 3 is an enlarged fragmentary view of an edge portion of the various components which are wrapped about the conductive lead wires and mandrel to initiate winding of the capacitor being formed;

FIG. 4 is an end view of a formed capacitor illustrating the dielectric film being cut longer than the metallized film to provide at least one outer wrapping of dielectric material;

FIG. 5 illustrates heat sealing of the dielectric outer covering for completing the structure of the metallized capacitor; and FIG. 6 is a cross-sectional view of the double-sided metallized film of the present invention.

DETAILED DESCRIPTION OF THE ILLUSTRATED EMBODIMENT

Referring now to FIG. 1, there is seen a fragmentary perspective view of portions of an apparatus which is constructed in accordance with the principles of this invention and is designated generally by reference numeral 10. The apparatus 10 is of the type for forming metallized film capacitors and includes first and second wire positioning means 11 and 12 for placing a pair of conductive lead wires 13 and 14 in parallel spaced relation to one another within the apparatus. The positioning means 11 and 12 also includes means for rotating the conductive lead wires 13 and 14 about a central axis located therebetween.

Metallized film transport means 16 includes a spool of film material 17 having metallic surfaces on both sides thereof and spaced apart by the dielectric material forming the film. This type of material is sometimes referred to as metallized film. The spool 17 delivers a length 18 of metallized film in a manner to be positioned between the pair of conductive lead wires 13 and 14. The metallized film 18 may be guided by a plurality of guide rollers, here one being designated generally by reference numeral 19. While a single metallized film is here illustrated having metallized surfaces formed on opposite sides to form the capacitance plates of the capacitor, it will be understood that two separate single sided metallized films may be incorporated without departing from the novel aspects of this invention.

A metal foil transport means designated generally by reference numeral 20 includes a roll 21 of metal foil, as for example, tin foil or the like, and delivers the tin foil over a pair of guide rollers 22 and 23 to have the terminating end thereof engage a support member 24. A second roll of metal film 26 has the length of film thereof wrapped about a pair of guide rollers 27 and 28. The terminating end of the metal foil 26 is supported by a support roller 29. To provide insulation between the opposing metallized surfaces of the film when it is rolled upon itself, a dielectric film transport means 30 is provided. Here a roll of dielectric film material 31 is supported to have the dielectric film material 32 thereof wrapped about a pair of guide rollers 33 and 34. The film material 32 has the terminating end thereof supported by a support member 36. With the terminating ends of the various lengths of material, i.e. the metallized film, metallic foils and dielectric film, the apparatus is then energized by suitable means to cause the conductive lead wires 13 and 14 to move toward one another thereby providing a partial wrap of metallic foil thereabout. A removable mandrel 40 is positioned to partially wrap a portion of the dielectric film 32 thereabout and position the end portion of the film immediately adjacent the metallized film 18.

A pair of cutter mechanisms 41 and 42 are associated with the metal foil strips 21 and 26 to cut predetermined lengths thereof to be inserted between the conductive lead wires and the respective metallized surfaces of the metallized film 18. It will be understood that other cutting means may be associated with each of the reel systems 17 and 31 for cutting the metallized film 18 and the dielectric film 32, respectively.

The method of forming capacitors in accordance with this invention is best illustrated by the schematic illustration of the apparatus of FIG. 2. Here the two-sided metallized film 18 is positioned to have the end portion thereof located between the parallel spaced apart conductive lead wires 13 and 14. A length of metallic foil is inserted between the adjacent surfaces of the metallized film and the conductive lead wires to improve electrical connection therewith. The metal foil has the end portions thereof wrapped about respective guide roller support members 24 and 29 and held in place by holding means 43 and 44, respectively. Pusher members 46 and 47 urge the conductive lead wires 13 and 14 toward one another firmly to engage the two-sided metallized film and the metal foil therebetween. A third pusher 48 inserts the removable mandrel 40 adjacent the conductive lead wires thereby placing the dielectric film 32 in firm contact with the underside of the metallized film and the metal foil 26 as illustrated. Once all the components are properly positioned, the conductive lead wires 13 and 14 and the removable mandrel 40 are rotated. In the illustrated embodiment the direction of rotation is counter-clockwise. However, it will be understood that clockwise rotation may be utilized if desired.

Referring now to FIG. 3, the details of wrapping the terminating ends of the metallized film, metallic foil and dielectric film are illustrated. Here the short strips of metallic foil are indicated by reference numerals 21a and 26a and are of sufficient length to partially wrap about their respective conductive lead wires 13 and 14. A small gap 46 may exist between the metallized film and the dielectric film as the result of the metallic foil 26a. It will be understood that in actuality the gap 46 is very minute as the metallic films are extremely thin.

After the desired number of turns of the wound capacitor are obtained, the mandrel 40 may be removed and the metallized film cut and wrapped about the wound capacitor to have the terminating end 45 thereof exposed, as best seen in FIG. 4. The length of the dielectric film 32 is cut longer than the metallized film 18 to cover the terminating end 45 with the dielectric film so that the terminating end 51 thereof extends beyond the terminating end 45. This then provides surface-to-surface contact between two layers of dielectric film to incase the capacitor.

As best seen in FIG. 5, heater means 49 is provided to have a strip heating element 50 thereof engage the dielectric film 32 at a region beyond the terminating end 45 of the metallized film 18 to cause heat sealing of the two outer layers of the dielectric film. This will substantially incase the entire wound capacitor and insure that the wound material will not unwind.

The dielectric film material 32 may be formed of a nonheat-shrinkable material, but it is preferably formed of a heat-shrinkable material. The reason for this is that upon shrinkage the short strips of metallic foils 21a and 26a will make a more sure contact with the leads 13 and 14. The short strips of foil 21a and 26a, in addition to serving to improve the electrical connection between the leads 13 and 14 and the metallized film 18, also serve to reduce possible shorting problems that could be caused by tearing of the dielectric material 32 when the leads 13 and 14 are pulled into the winding.

The ends of the capacitor are sprayed with a conductive film to reduce the resistance of the unit. The metallized film 18 is constructed to have unmetallized margin areas 57 and 59, as shown in FIG. 6. Thus, when the capacitor is wound and sprayed on its ends, the layers 58 will be interconnected by the sprayed conductive film on the left-hand end 61 of the film 18; but due to the margin 57 the layers 56 will not be connected to the layers 58. Similarly, the layers 56 will be interconnected by the sprayed conductive film at the right-hand end 63 of the film 18 where again the margin 59 prevents shorting to the layers 58. The layers 56 and 58 could alternately be formed as extended layers which extend outwardly beyond the ends 61 and 63 of the dielectric layers 60 if desired.

What has been described is a simple and efficient method and apparatus for forming metallized wound capacitors wherein two of the conductive lead wires are utilized to rotate the capacitance material, and a removable mandrel is utilized to hold the dielectric material in place and to assist in the winding operation. In view of the various aspects of the embodiment disclosed herein, it will be understood that variations and modifications of the invention can be incorporated without departing from the novel concepts disclosed and claimed herein.

The invention is claimed as follows:

1. Apparatus for forming a metallized film capacitor, comprising: first and second wire positioning and rotating means for placing a pair of conductive lead wires in parallel spaced relation to one another, metallized film support means to deliver one end of a length of metallized film between said pair of conductive lead wires, metal foil transport means to position a pair of metallic foils of predetermined lengths on opposite sides of the metallized film near said one end thereof to make electrical contact between the metallized film and the respective pair of conductive lead wires, dielectric transport means to place one end of a length of dielectric material over said one end of said metallized film and one of said predetermined lengths of metallic foil, and drive means for rotating said pair of conductive lead wires about an axis therebetween to wrap said metallized film, said predetermined lengths of metallic foil and said dielectric material, whereby a metallized foil wound capacitor of a given value is formed by a predetermined number of revolutions of said pair of lead wires.

2. The apparatus as set forth in claim 1 further including means to form an initial partial wrap of said pair of metallic foils about their respective conductive lead wires prior to rotating the lead wires by said drive means.

3. The apparatus as set forth in claim 1 wherein each of said pair of metal foils is cut from a separate continuous length of metal foil material wrapped about a spool, and further including holding means for engaging the free end of said length of metal foil in position adjacent the respective conductive lead wire and cutting means for cutting said continuous lengths of metal foil into said predetermined lengths.

4. The apparatus as set forth in claim 1 further including mandrel means positioned adjacent to and parallel with the conductive lead wires to hold said end of the dielectric film in place during initial rotation of said conductive lead wires, said mandrel means being removable from its position after the wound capacitor is formed.

5. The apparatus as set forth in claim 1 further including heat seal means positioned adjacent the wound capacitor for heating at least one turn of dielectric material over the terminating end of said metallized film to provide a heat seal between two adjacent layers of dielectric material.

6. The apparatus as set forth in claim 1 including first spool support means for receiving a roll of metallized film, second spool support means for receiving a first roll of metal foil, third spool support means for receiving a second roll of metal foil, and fourth spool support means for receiving a roll of dielectric film, and means for transporting said metallized film, said first and second rolls of metal foil, and said roll of dielectric film from their respective rolls.

7. The apparatus as set forth in claim 6 further including guide roller means associated with each of the transport means for said metallized film, said first and second rolls of metal foil and said dielectric film.

8. A method of forming metallized film capacitors comprising the steps of: positioning a pair of conductive lead wires in parallel spaced apart relation to one another, placing one end of a length of metallized film having first and second conductive layers between said pair of spaced apart conductive lead wires, placing metal foil strips on each side of said metallized film between the respective conductive lead wires to provide electrical contact between the conductive lead wires and said respective conductive layers, placing the end of a length of dielectric film adjacent the metallized film to overlie one of said metal foils, rotating said conductive lead wires about an axis located between the axes of the lead wires to wrap the metallized film and the metal foils and the dielectric material thereabout to form a wound capacitor structure, and spraying a conductive film onto the ends of said wound capacitor so as to interconnect the edges of said first conductive foil at one end of said wound capacitor and the edges of said second conductive foil at the other end of said wound capacitor.

9. The method of forming a metallized film capacitor as set forth in claim 8 further including the step of inserting a removable mandrel between said spaced apart conductive lead wires to hold said dielectric material in position during initial rotation of said lead wires, and removing said mandrel at a time after the metallized capacitor is being wound.

10. The method of forming a metallized film capacitor as set forth in claim 8 further including the step of cutting said metallized film and said dielectric film into predetermined lengths after being wound about said conductive lead wires to form a capacitor of predetermined value.

11. The method as set forth in claim 10 further including the step of heat sealing said dielectric material upon itself at the outer surface of the wound capacitor to enclose said metallized film and said metal foils therein.

* * * * *